Dec. 2, 1930. N. STATHAM 1,783,550
FLEXIBLE FASTENING DEVICE
Filed Aug. 1, 1925
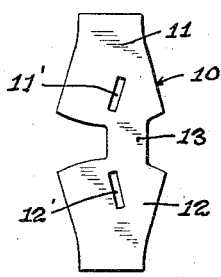
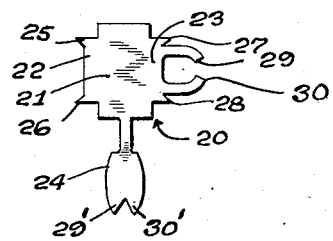
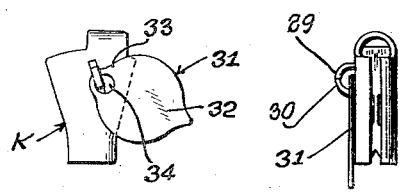
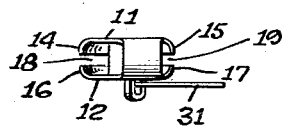
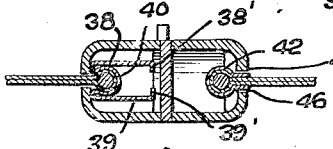
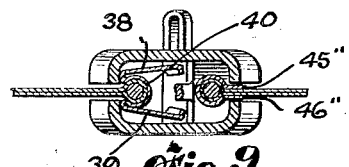
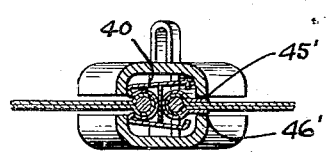
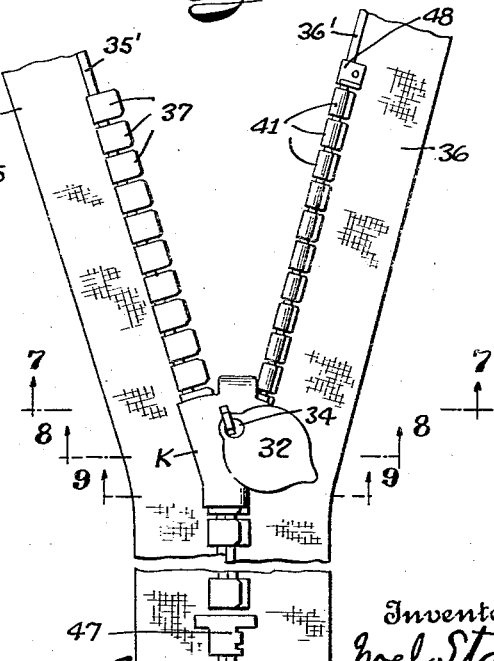
Inventor
Noel Statham
By his Attorney Patented Dec. 2, 1930

1,783,550

UNITED STATES PATENT OFFICE

NOEL STATHAM, OF IRVINGTON-UPON-HUDSON, NEW YORK

FLEXIBLE FASTENING DEVICE

Application filed August 1, 1925. Serial No. 47,430.

My present invention relates to flexible fastening devices and operating members therefor. While not limited thereto, my present invention relates more particularly to flexible fastening devices intended to serve as seam-closing or closure-providing means for dresses, corsets, shoes, bags, and the like, and applies more particularly but not exclusively to flexible fastening devices, for the purposes designated, as well as for other purposes for which such devices are used, of the spring clip type, that is, employing the spring clip type of fastener. It is an object of the present invention to devise flexible fastening devices which are simple in construction, easy and convenient to fabricate and to assemble, rugged in construction, and certain, accurate and convenient in operation, and also to devise flexible fastening devices adapted to embody and to be used with the keys or operating members of the present invention, such flexible fastening devices being themselves characterized by their simplicity in construction, the ease, convenience and cheapness with which they may be fabricated and assembled, their wide range of usefulness and applicability, their ease, convenience, accuracy and long wear in use, and their neatness and attractiveness in appearance. Other advantages of the present invention will in part be pointed out hereinafter and will in part be obvious to those skilled in the art to which the present invention relates.

The subject matter of this application is in part disclosed in a patent of mine, issued June 5th, 1928, bearing Patent No. 1,672,627, and entitled Flexible fastening devices.

In the accompanying specification I shall describe and in the annexed drawing show an illustrative embodiment of the present invention. It is, however, to be clearly understood that my invention is not limited to the specific form thereof herein shown and described for purposes of illustration only.

Referring now to the drawing illustrating the aforesaid illustrative embodiment of the present invention:

Fig. 1 is a plan view of the casing blank for the key or operating member;

Fig. 2 is a plan view of the spreading member blank for the casing or operating member;

Fig. 3 is a side elevation of the completed key;

Fig. 4 is an edge view of the completed key;

Fig. 5 is a top plan view of the completed key;

Fig. 6 is a plan view of the assembled flexible fastening device and associated key or operating member, the device being shown partly in open and partly in closed position;

Fig. 7 is a cross-sectional view taken along line 7—7 of Fig. 6;

Fig. 8 is a cross-sectional view taken along line 8—8 of Fig. 6; and

Fig. 9 is a cross-sectional view taken along line 9—9 of Fig. 6.

Referring now to the aforesaid illustrative embodiment of the present invention, and more particularly to the drawing illustrating the same, the key or operating member there illustrated is preferably made up of a casing blank 10 having the plate portions 11 and 12 and the connecting web portion 13. The plate portions 11 and 12 are provided with the slots 11' and 12', respectively, for a purpose to be described in greater detail hereinafter.

During the operation of forming the key or operating member, here generally designated by reference character K, the blank 10 is subjected to one or more operations in a suitable die or dies so as to provided the same with the flanged portions shown. The plate portion 11 is provided with the flange portions 14 and 15, while the plate portion 12 is provided with the flange portions 16 and 17. It will thus be noted that the casing is provided with the slots or channels 18 and 19, the slot or channel 18 being provided between the flange portions 14 and 16 of the plates 11 and 12, respectively, and the slot 19 being provided between the flange portions 15 and 17 of the plate portions 11 and 12, respectively.

Before operating on the partly formed blank 10 to bring the same into the final shape and position shown in Figs. 3, 4, 5 and 6 of the drawing, the spreading member, the blank for the formation of which is shown in Fig. 2 is within the casing 10. The spreading member blank, here indicated by reference character 20, comprises the main body or web portion 21, the lateral fastening portions 22 and 23, and the lower forked spreading or key portion 24. Preferably the blank 20, as in the case of the blank 10, is made from a single integral metal stamping by the use of a suitable die or equivalent forming means. The portion 22 of the blank 21 is provided with the locking ears or fastening members 25 and 26. Similarly, the portion 23 of the blank 20 is provided with the locking ears or fastening members 27 and 28. This latter portion 23 is also provided with the prongs or extensions 29 and 30 for a purpose to be set forth in detail hereinafter.

In assembling the spreading member 20 within the casing member 10 of the key K, the lateral members 22 and 23 are inserted within the partly formed casing 10 so as to pass into the slots 11' and 12', respectively. In this position of the operating member 20 within the casing portion 10, the ears 25 and 26 will extend beyond the outer surface of the slot 11' while the ears 27 and 28 will extend beyond the outer surface of the slot 12'. Preferably, the lateral fastening members 22 and 23 are of such length as to fit more or less snugly within the respective slots 11' and 12'. In this position of the spreading member 20 within the casing portion 10, the prongs or extensions 29 and 30 extend well beyond the outer surface of the plate portion 12.

The key thus assembled is placed within a suitable die which acts to force the ears 25 and 26, and also the ears 27 and 28, away from each other and to squash the same down against the sides of the plate portions 11 and 12 of the key K. This operation locks the spreading member securely within the casing 10 of the key K. At the same time the plate portions 11 and 12 of the key K are firmly and rigidly held in proper spaced relation, thus rendering the channels 18 and 19 accurate and permitting the proper alignment of the key or operating member K with respect to the flexible fastening tapes with which the same is to be used.

Simultaneously with the aforesaid assembling operation, or subsequently thereto, an operating member is applied to the key thus obtained. For this purpose I may use the operating member designated by reference character 31 and comprising the main body portion 32 and the eyelet portion 33 having the eye 34 therein. By threading one of the aforesaid forked portions or extensions 29 and 30, such as the forked portion or extension 29, through the eye 34 of the eyelet portion 33 of the operating member 31, and thereafter pressing the portions 29 and 30 tightly together, an eye is formed which serves to position and properly retain the key or operating member 32.

This completes the description of the fabrication and assembly of the key or operating member forming a part of the present invention and intended to be employed with the flexible fastening devices now to be described. The flexible fastening device is, as has already been stated, preferably of the spring clip type. While various types or flexible fastening devices, whether of the spring clip type or otherwise, may be successfully employed with the operating keys or members of the present invention, I prefer to employ such keys or operating members with flexible fastening devices of the type illustrated in the drawing. The flexible fastening device shown in the drawing and particularly in Figs. 6, 7, 8 and 9 thereof, comprises a plurality of opposed supporting tapes 35 and 36. The tapes 35 and 36 have the beaded edges 35' and 36' respectively, to enable the same to more readily receive and retain the respective fastening members. The tape 35 carries the female fastening members in closely spaced relation, these fastening members being here generally indicated by reference character 37. As shown, the female fastening members are preferably made up of spring metal in integral form comprising the spring jaw portions 38 and 39 and the inwardly turned bead-receiving portion 40. 38' and 39' indicate transverse biting or jaw members of the female fastening devices 37.

Cooperating with the female fastening members 37 and in equivalent spaced relation on the opposed tape, are the male fastening members or clips, here generally designated by reference character 41. Just as the female fastening members 37 receive, within the inwardly turned bead-receiving portions 40, the beaded edge 35' of the supporting tape 35, so also the male fastening members 41 are each provided with the bead-receiving portions 42 and the binding portions 45 and 46 which provide the bearing surfaces 45' and 46', respectively. The inner edges of the portions 45 and 46 of the male fastening members 41 are preferably aligned or substantially straight, as indicated by reference characters 45'' and 46''.

Suitable lengths of the tapes 35 and 36, carrying the respective fasteners, are cut off from the continuous or other tapes to which the respective fasteners have been applied in a suitable machine or by hand. The two tapes are now fastened together by a staple or like fastening member indicated by reference character 47 and more clearly shown in Fig. 6 of the drawing. This staple or fastening member 47 serves also as a lower stop for the key or operating member. The latter is now threaded over the respective fasteners in proper position and the upper staple or stop 48 is now applied to one of the fastener-carrying tapes, in this case to the tape 46 carrying the male fasteners 41.

The construction of the aforesaid illustrative embodiment of the present invention has, it is believed, been made clear from the foregoing description. Likewise the manner of assembling the device has, it is believed, been made sufficiently clear from the foregoing description. The manner of operating the device will likewise be clear to those skilled in the art to which the present invention relates, but may be briefly summarized as follows:

With the key properly positioned on the flexible fastener, the tape 35 carrying the fasteners 37 will have the beaded edge portion 35' thereof within the bead-receiving portion 40 of such fasteners. The main body portion of the tape 35, which, together with the main body portion of the tape 46, may be suitably stitched or otherwise fastened to the shoe, bag, garment or other device with which the flexible fastening devices and the keys or operating members therefor of the present invention may be employed, passes through the slot or channel 18 of the key K. The flanged portions 14 and 16 of the key K embrace the particular fastener or fasteners 37 mounted on the tape 35. However, the dimensions of the designated parts are such that the flanged portions 14 and 16 will not come into contact with the tape, which would tend to wear the tape out too quickly, but, if the key is unduly compressed or the female fastening devices 37 unduly expanded, the flange portions 14 and 16, or even the plate portions 11 and 12 of the key K, will bear against the sides or corners of the female fasteners 37 themselves.

Likewise, the main body portion of the tape 36 carrying the male fasteners 41 passes out through the channel 19 between the flange portions 15 and 17. These latter ride in the channels 45' and 46' provided by the clamping portions 45 and 46 of the male fastening members 41 between the bead-receiving portion 45 and the edge portions 45'' and 46'' of such fasteners.

In operating the flexible fastening devices into closed position, the key is moved upwardly from the position shown in Fig. 6 of the drawing, which manipulation may readily be effected by means of the operating member 31. This action serves, by the pressure exerted by the flange portions 15 and 17, and 14 and 16, to press the male fastening members 41 into the respective female fastening members 37. In the reverse movement of the key or operating member K to open the fastening devices, the two pointed portions 29' and 30' of the forked spreading or key portion 24 enter within the female fastening member 37 on either side of the male fastening member 41 positioned within the female fastening member. This action spreads apart the spring sides 38 and 39 of the female fastening member 37 against the natural spring action of the spring sides or jaws 38 and 39 of such female fastening member. The further movement of the key or operating member in a downward direction from the position shown in Fig. 6 of the drawing serves to spread apart pair after pair of cooperating male and female fasteners.

This completes the description of the operation of the device. The advantages of the devices of the present invention are numerous and of great practical importance. The flexible fastening devices and operating members therefor of the present invention are simple in construction, easy and convenient to fabricate and to assemble, and certain, convenient and accurate in operation. The devices may be readily and cheaply fabricated, whereby there is provided a very wide range of usefulness and applicability for the devices of the present invention. Other advantages of the devices of the present invention will readily occur to those skilled in the art to which the same relates.

What I claim as my invention is:

1. A key for operating flexible fastening devices comprising an integral metal casing having a plurality of spaced opposed side plates and a connecting web portion, said casing being provided with an integral spreading member provided with a forked spreading portion and being positioned within said casing and serving to retain and position said side plates in proper spaced relation, said spreading member being provided with a lateral portion passing through a slot in one of said side plates for providing a loop for attachment to an operating member and being provided with an additional lateral portion passing through a slot in the remaining side plate for attachment thereto.

2. A key for operating flexible fastening devices comprising an integral metal casing having a plurality of spaced opposed side plates and a connecting web portion, said casing being provided with an integral spreading member provided with a forked spreading portion and being positioned within said casing and serving to retain and position said side plates in proper spaced relation, said spreading member being provided with a lateral portion passing through a slot in one of said side plates for providing a loop for attachment to an operating member.

3. A key for operating flexible fastening devices comprising an integral metal casing having a plurality of spaced opposed side plates and a connecting web portion, each of said side plates being provided with an inwardly turned flange portion at each of its lateral edges, the opposed flange portions at each side of said casing being spaced apart to provide a channel for the passage therethrough of a portion of said flexible fastening device, said casing being provided with an integral spreading member provided with a forked spreading portion and being positioned within said casing and serving to retain and position said side plates in proper spaced relation, said spreading member being provided with a lateral portion passing through a slot in one of said side plates for providing a loop for attachment to an operating member and being provided with an additional portion passing through a slot in the remaining side plate for attachment thereto.

4. A key for operating flexible fastening devices comprising an integral metal casing having a plurality of spaced opposed side plates and a connecting web portion, each of said side plates being provided with an inwardly turned flange portion at each of its lateral edges, the opposed flange portions at each side of said casing being spaced apart to provide a channel for the passage therethrough of a portion of said flexible fastening device, said casing being provided with an integral spreading member provided with a forked spreading portion and being positioned within said casing and serving to retain and position said side plates in proper spaced relation, said spreading member being provided with a lateral portion passing through a slot in one of said side plates for providing a loop for attachment to an operating member.

In testimony, whereof, I have signed my name to this specification this 15th day of July, 1925.

NOEL STATHAM.